G. J. REED.
MOUTH SPECULUM.
APPLICATION FILED SEPT. 13, 1907.
925,380.
Patented June 15, 1909.
2 SHEETS—SHEET 1.
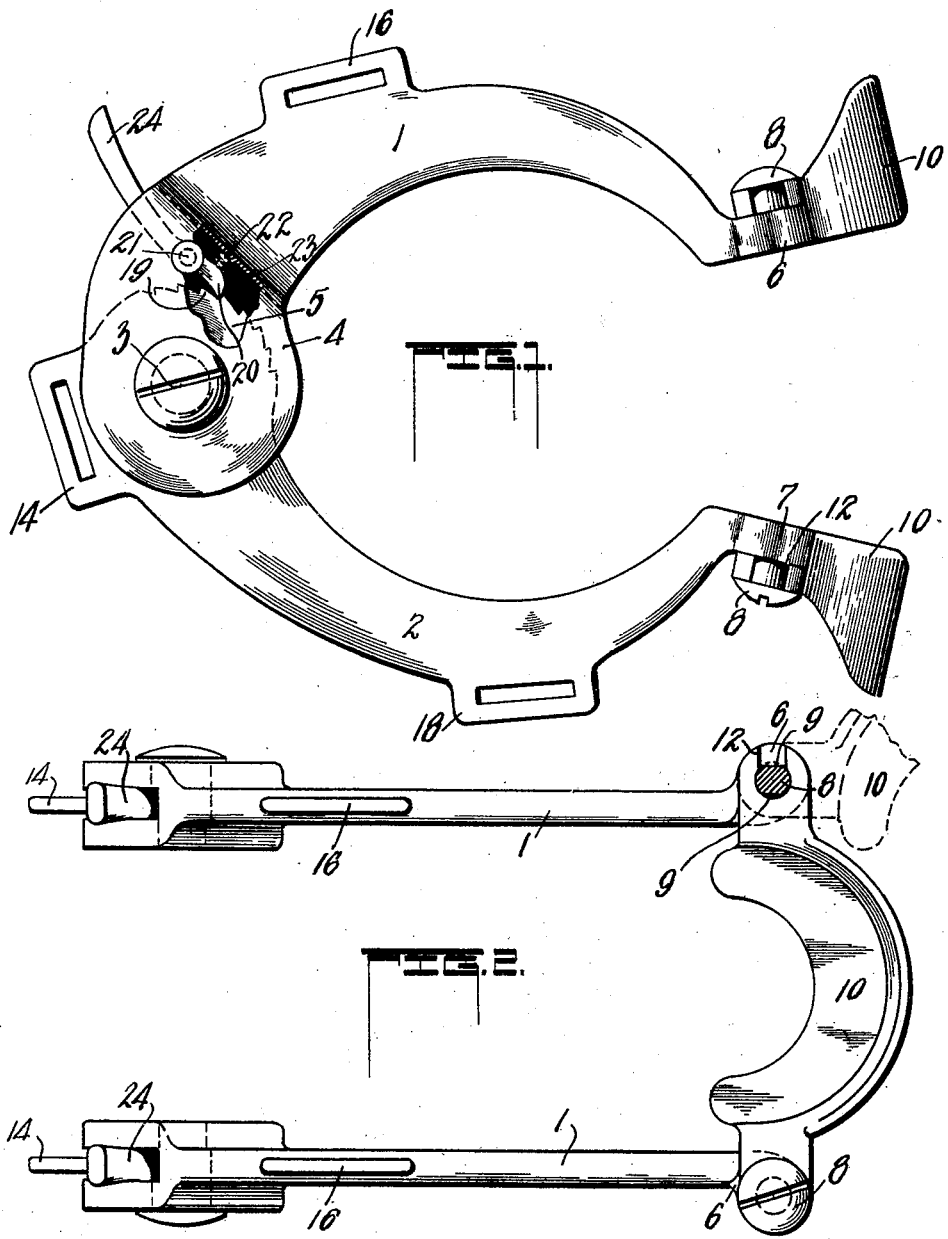

G. J. REED.
MOUTH SPECULUM.
APPLICATION FILED SEPT. 13, 1907.
925,380.
Patented June 15, 1909.
2 SHEETS—SHEET 2.
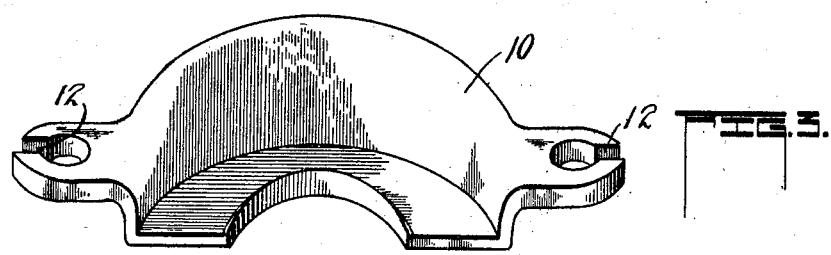
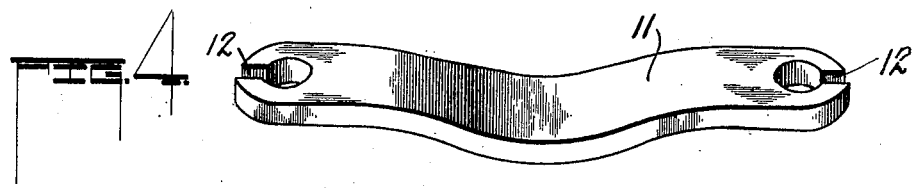
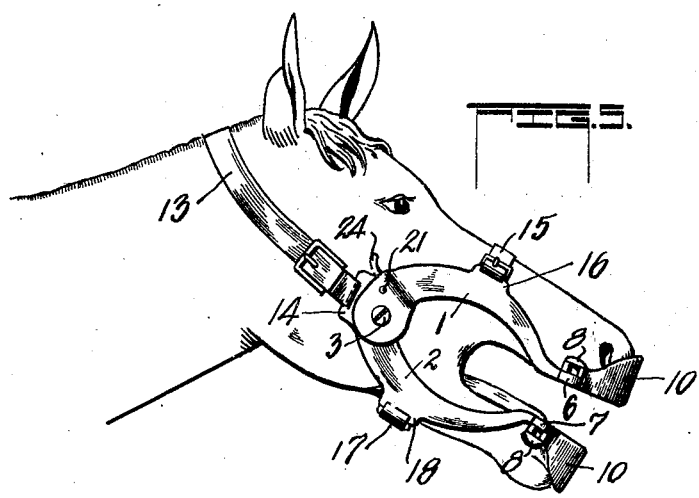

UNITED STATES PATENT OFFICE.

GARNET J. REED, OF PEORIA, ILLINOIS, ASSIGNOR OF ONE-HALF TO ALBERT MEIERHOFER, OF MINONK, ILLINOIS.

MOUTH-SPECULUM.

No. 925,380.  Specification of Letters Patent.  Patented June 15, 1909.

Application filed September 13, 1907. Serial No. 392,806.

*To all whom it may concern:*

Be it known that I, GARNET J. REED, a citizen of the United States, residing at Peoria, in the county of Peoria and State of Illinois, have invented certain new and useful Improvements in Mouth-Specula; and I do hereby declare that the following is a full, clear, and exact description of the invention, which will enable others skilled in the art to which it appertains to make and use the same.

This invention has reference to certain new and useful improvements in mouth speculums, of that class used in veterinary surgery; purpose of which is to provide a simple and the convenient device for holding open an animal's mouth, to facilitate the administration of medicine, or working in the mouth, or upon the teeth or adjacent organs, of such animals, which are reached through the mouth.

The details of construction, arrangement, combination, and operation of parts will be understood from the following description, reference being had to the accompanying drawings, in which:—

Figure 1 is a side elevation, partly in section, of my improved speculums, the side-bars or curved jaws, shown partly distended; Fig. 2 is a plan of Fig. 1; Fig. 3 is a perspective of a semi-lunar cupped plate, serving as a bit, to receive upper or lower teeth; Fig. 4 is a perspective of one form of cross-bar which may be substituted for the plates, when it is desired to operate upon the teeth, particularly the incisors, and Fig. 5 is a representation of a horse's head showing the manner of attaching or securing the speculum thereto.

Like numerals of reference indicate corresponding parts throughout the figures.

The speculum consists of four curved side bars or jaws arranged in two pairs. Both pairs comprising upper bars or jaws 1 and lower bars or jaws 2, hinged together at 3. Each bar or jaw tapers from its rear to its forward end as shown in Fig. 1; the rear ends of each, from the side having the appearance of disk-like portions 4 and 5 and the forward ends of each are flattened as at 6 and 7, to provide ears to which may be attached suitable bolts or studs 8, which may or may not have a fixed connection with the ears of said bars or jaws. The preferred arrangement, however, is to provide headed studs, the shanks of which are flattened on two sides, as at 9, see Fig. 2, and the bits, such as the semi-lunar cupped plates 10 or the cross-bars 11 have the key-hole shaped slots 12, so that said bits may be slipped off the studs in one direction. To connect or attach the bits, one end of each is slipped on to a stud of the upper and lower bar or jaw of each pair and given a quarter turn when they will be locked to or prevented from becoming disengaged from said studs; then to complete the connection of the bits to the other set of bars or jaws, the studs of each are inserted into the slots of the bits and given a quarter turn to lock the said bars or jaws to the bits. It is to be understood, however, that I do not limit myself to any particular form of bit nor to the manner of connecting the same to the bars or jaws. The semi-lunar plates 10, are used when making examinations and operating upon the molar teeth, and are so made that they will fit the mouth and receive the front teeth, so that the pressure of the jaws will be brought upon the front teeth instead of the soft tissues of the gums.

For operating upon the incisors, the cupped plates 10 are removed from the bars or jaws and the cross-bars 11 are substituted. They are so shaped as to adapt themselves to the contour of the upper and lower jaws and distribute the pressure uniformly without bruising or hurting the gums. The cross-bars 11 as shown have no covering but it is understood may have a covering of rubber or other suitable material.

In Fig. 5, the speculum is shown attached to a horse's head, the mouth open and the semi-lunar plates 10 in use. To attach the speculum, a strap 13, which goes over the head behind the ears, has suitable connection with loops or eyes 14 at the inner ends of the bars or jaws 2 and behind the pivotal connection thereof, with the upper bars or jaws; a strap 15 which has suitable connection with loops or eyes 16, of the bars or jaws 1, extends over the nose of the horse, while a strap 17 which has suitable connection with loops or eyes 18 of the bars or jaws 2, extends under the jaw of the horse.

The rear ends 4 of the upper bar or jaw 1 of each pair of jaws are bifurcated to provide a forked end with spaced ears, which, when the upper and lower bars or jaws 1 and 2 are pivoted together are slipped down over the rear end 5 of the lower bars or jaws 2, as seen in Fig. 1. And the periphery of the portion 5 of the bars or jaws 2 or a part thereof, is provided with rachet teeth 19 or suitable serrations, which, as shown, are completely closed within the bifurcated ends of the upper bars or jaws 1; and normally engaging some one of the ratchet teeth 19 of each lower bar or jaw 2 is a ratchet pawl 20 which is pivotally connected at 21 with and between the ears of said upper bars or jaws 1. The engaging portion of said pawls 20 with the ratchet teeth 19 are yieldingly held in such engagement by a spring 22 which is carried between the ears forming the bifurcation of the upper jaws, and bears against the pawl 20 and also a wall or shoulder 23 from which the ears emerge and which overrides the ratchet teeth 19 as shown. The pawls, each have finger holds 24, which project rearwardly and upwardly from without and between the bifurcated ends of the jaws 1, to enable an operator to press down upon the same and release said pawls from engagement with the ratchet teeth when it is desired to close the jaws or bring the bits together. Immediately upon the release of the finger holds of said pawls, the springs will act to force the pawls again into engagement with the teeth of the ratchet and lock the bars or jaws 1 and 2 against closing.

One of the objects which I have in view in the present construction, is to provide a mouth speculum which has all the advantages of mouth speculums heretofore in use, and disclosed by the prior art, but also to provide a speculum which will obviate a great many of the disadvantages found in other speculums. One of the disadvantages which I might mention, is that of making a speculum where the space between the upper and lower bars or jaws is partially interfered with by the mechanism for locking the same when opened, which very materially interferes with a surgeon who may have occasion to operate upon the mouth or the teeth and particularly the molars. Another disadvantage is, in exposing to view the mechanism aforesaid, for controlling the opening and closing of the upper and lower jaws, which, when they have not been in the way of an operator, are so disposed as to irritate the cheeks of the horse and cause him to be more or less restless and irritable. I have not only overcome such disadvantages but have provided a speculum composed of the fewest number of parts and with the very simplest of mechanism for controlling the opening and closing of the jaws and have inclosed the parts forming such mechanism, with the exception of the short finger holds 24, which are the only parts exposed to view and which are placed at a very convenient point for operation when it is desired to release the locking mechanism so that the horse upon closing his mouth may return the jaws of the speculum to a closed position.

In operation, the speculum is placed over the nose of a horse, substantially in the manner shown in Fig. 1 with the jaws thereof, resting on each side of the animal's head or along the side of his cheeks. When placed in position, the jaws are closed and the straps 13, 15 and 17 adjusted for retaining the said jaws in suitable position. The bits 10, or 11, if desired, are placed in the mouth of the animal, so that the upper and lower front teeth engage with said bits, particularly if those referred to as 10, are used. The mouth is then forced open, by opening or distending the forward end of the jaws 1 and 2 which oscillate on the pivots 3; the ratchet teeth of the lower jaw will ride beneath the acting portion 20 of the pawl and said pawl will act automatically after the release of the jaws to hold the same at any desired degree of distention. After the operation has been performed, or medicine administered, if it is desired to administer medicine to the horse, the jaws may be released by pressing down upon the finger holds 24 of the pawls which will raise their acting ends against the tension of the springs 22, which will allow the said jaws to be closed, the release of the finger holds will allow the springs to act to force the pawls into engagement with the ratchet teeth.

Having thus fully described my invention, what I claim and desire to secure by Letters Patent of the United States, is:—

1. In a speculum, the combination of upper and lower jaws, the former having a bifurcated end, the latter having its corresponding end provided with ratchet teeth formed integrally therewith and pivoted to the upper jaw within its bifurcated end, a pawl pivoted to and between the bifurcations of the upper jaw and having a finger-hold projecting rearwardly and from without said bifurcations, and means for yieldingly holding the pawl in engagement with the ratchet teeth of the lower jaw, said yielding means interposed between the pawl and wall of the upper jaw merging into said bifurcations, so as to bear downwardly on said pawl.

2. In a speculum, the combination of two pairs of jaws, each composed of an upper and lower jaw, the upper jaws of each pair having bifurcated inner ends, the lower jaws having their inner ends provided with ratchet teeth formed integrally therewith and pivoted to their respective upper jaws within their bifurcations, a pawl pivoted to and between the bifurcations of each of the upper jaws and having a finger-hold projecting rearwardly and from without said bifurcations, means for yieldingly holding the pawls in engagement with the ratchet teeth of the lower jaws, said yielding means interposed between the pawl and wall of the upper jaw merging into said bifurcations, so as to bear downwardly on said pawl, and interchangeable bits adapted to have a detachable connection with the upper jaws of each pair and also the lower jaws of each pair.

3. In a speculum, the combination of upper and lower jaws, the former having a bifurcated end forming an interior shoulder, the latter having its corresponding end pivoted to the upper jaw within its bifurcated end and provided with ratchet teeth spaced from the shoulder aforesaid, a pawl pivoted to and between the bifurcations of the upper jaw and intermediate the shoulder aforesaid and said ratchet teeth, a spring bearing between the shoulder and inner end of the pawl for yieldingly holding said pawl in engagement with the ratchet teeth, said pawl provided with a finger-hold projecting rearwardly from without the bifurcations aforesaid.

In testimony whereof I affix my signature, in presence of two witnesses.

GARNET J. REED.

Witnesses:
CHAS. W. LA PORTE,
LAURA E. CLAYPOOL.